United States Patent
Lee et al.

(10) Patent No.: US 10,824,003 B2
(45) Date of Patent: Nov. 3, 2020

(54) OPTICAL FILM, POLARIZING PLATE INCLUDING THE SAME, AND LIQUID CRYSTAL DISPLAY INCLUDING THE SAME

(71) Applicant: Samsung SDI Co., Ltd., Yongin-si (KR)

(72) Inventors: Dae Gyu Lee, Suwon-si (KR); Yong Un Jung, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 131 days.

(21) Appl. No.: 16/195,374

(22) Filed: Nov. 19, 2018

(65) Prior Publication Data

US 2019/0187349 A1 Jun. 20, 2019

(30) Foreign Application Priority Data

Dec. 19, 2017 (KR) .................. 10-2017-0175591

(51) Int. Cl.
| | | |
|---|---|---|
| G02F 1/1335 | (2006.01) | |
| G02B 5/30 | (2006.01) | |
| C09B 29/08 | (2006.01) | |
| C09J 11/06 | (2006.01) | |
| G02B 1/14 | (2015.01) | |

(Continued)

(52) U.S. Cl.
CPC .......... *G02F 1/133528* (2013.01); *B32B 7/12* (2013.01); *C09B 29/0834* (2013.01); *C09B 67/0046* (2013.01); *C09J 11/06* (2013.01); *G02B 1/14* (2015.01); *G02B 5/0236* (2013.01); *G02B 5/0268* (2013.01); *G02B 5/0294* (2013.01); *G02B 5/305* (2013.01); *G02B 27/285* (2013.01); *G02F 1/133509* (2013.01); *C08K 5/0041* (2013.01); *C08K 5/23* (2013.01);

(Continued)

(58) Field of Classification Search
CPC ...... G02B 1/14; G02B 5/0236; G02B 5/0294; G02B 5/205; G02B 5/223; G02B 5/305; G02B 5/3083; G02F 1/133502; G02F 1/133528; G02F 1/133509; G02F 2203/023; Y10T 428/1041
See application file for complete search history.

(56) References Cited

U.S. PATENT DOCUMENTS

2005/0037279 A1* 2/2005 Miyako .................. C09J 11/06
430/270.1
2016/0252665 A1* 9/2016 Lee .................... G02B 5/3083
359/489.07

FOREIGN PATENT DOCUMENTS

JP 2006-251659 A 9/2006
KR 10-0220494 B1 9/1999
(Continued)

OTHER PUBLICATIONS

Taiwan Office Action dated May 23, 2019 from corresponding Taiwan Patent Application No. 107139056 (7 pgs.).

(Continued)

*Primary Examiner* — Sophie Hon
(74) *Attorney, Agent, or Firm* — Lewis Roca Rothgerber Christie LLP

(57) ABSTRACT

An optical film, a polarizing plate including the same, and a liquid crystal display including the same are provided. The optical film includes a protective layer and a contrast improving layer, wherein the contrast improving layer includes a second resin layer that is stacked from the protective layer, and a first resin layer facing the second resin layer.

17 Claims, 1 Drawing Sheet

(51) Int. Cl.
  *B32B 7/12*   (2006.01)
  *C09B 67/22*  (2006.01)
  *G02B 27/28*  (2006.01)
  *G02B 5/02*   (2006.01)
  *C08K 5/23*   (2006.01)
  *C08K 5/00*   (2006.01)
  *G02B 5/04*   (2006.01)

(52) U.S. Cl.
  CPC .. *G02B 5/045* (2013.01); *G02F 2001/133507* (2013.01); *Y10T 428/1041* (2015.01)

(56) References Cited

FOREIGN PATENT DOCUMENTS

| | | | |
|---|---|---|---|
| KR | 10-2010-0091977 | A | 8/2010 |
| KR | 101659241 | B1 * | 9/2016 |
| KR | 10-2017-0122611 | A | 11/2017 |
| TW | 200524997 | A | 8/2005 |
| TW | 201631340 | A | 9/2016 |

OTHER PUBLICATIONS

Korean Office Action from corresponding Korean Patent Application No. 10-2017-0175591, Korean Office Action dated May 1, 2020 (4 pgs.).

U.S. Notice of Allowance dated Sep. 21, 2020, issued in U.S. Appl. No. 16/155,755 (9 pages).

\* cited by examiner

OPTICAL FILM, POLARIZING PLATE INCLUDING THE SAME, AND LIQUID CRYSTAL DISPLAY INCLUDING THE SAME

CROSS-REFERENCE TO RELATED APPLICATION

This application claims priority to and the benefit of Korean Patent Application No. 10-2017-0175591, filed on Dec. 19, 2017 in the Korean Intellectual Property Office, the entire content of which is incorporated herein by reference.

BACKGROUND

1. Field

One or more aspects of example embodiments of the present disclosure are related to an optical film, a polarizing plate including the same, and a liquid crystal display including the same.

2. Description of the Related Art

A liquid crystal display (LCD) is operated to emit light from a backlight unit through a liquid crystal panel. Since light emitted from the backlight unit is perpendicularly (normally) incident upon an LCD screen, the LCD screen has a lower contrast ratio (CR) when viewed in a lateral direction than when viewed in a front direction. Therefore, optical films for improving side contrast ratios are being developed.

An optical film includes a low refractivity layer and a high refractivity layer, and improves a side contrast ratio of an optical display using optical patterns. The side contrast ratio of an optical display may be improved by using an optical film in which flat sections and optical patterns are alternately formed. However, although the optical film may improve the side contrast ratio of the optical display, the optical display generally undergoes deterioration in front contrast ratio when the optical patterns obstruct light emitted from a front side of the optical display, and also suffers from increased reflectance due to external light entering the optical patterns during non-operation of the optical display.

SUMMARY

One or more aspects of example embodiments of the present disclosure are directed toward an optical film that may improve a front contrast ratio and/or enhance a viewing angle while reducing reflectance.

One or more aspects of example embodiments of the present disclosure are directed toward an optical film that may reduce brightness at a side surface thereof in a black mode, and may reduce color shifting.

One or more aspects of example embodiments of the present disclosure are directed toward an optical film that allows efficient curing of a composition for a low refractivity layer to minimize or reduce separation of dyes from the low refractivity layer, thereby providing good external appearance.

One or more aspects of example embodiments of the present disclosure are directed toward a polarizing plate including the optical film for improving a contrast ratio and/or enhancing the viewing angle according to embodiments of the present disclosure, and an optical display including the same.

According to one or more example embodiments of the present disclosure, an optical film includes: a protective layer and a contrast improving layer; wherein the contrast improving layer includes a first resin layer and a second resin layer facing the first layer; and the second resin layer and first resin layer are sequentially stacked from the protective layer. The second resin layer has a lower index of refraction than the first resin layer, and the first resin layer includes a patterned portion with at least two embossed optical patterns and a flat section between and adjacent to the at least two embossed optical patterns. The patterned portion is formed in at least some region of the first resin layer facing the second resin layer and satisfies Equation 1. A corresponding one of the embossed optical patterns has a base angle θ of about 75° to about 90°, and the second resin layer includes a metal complex salt dye and/or an organic black dye.

$$\text{about } 1 < P/W \leq \text{about } 10. \quad \text{Equation 1}$$

In Equation 1, P is the pitch (unit: μm) of the patterned portion, and W is the maximum width (unit: μm) of a corresponding one of the embossed optical patterns.

In some embodiments, the corresponding one of the embossed optical patterns has an aspect ratio (H1/W) of about 0.1 to about 10, where H1 is a maximum height (unit: μm) of the corresponding one of the embossed optical patterns.

In some embodiments, the metal complex salt dye and/or the organic black dye may be present in an amount of about 0.01 wt % to about 10 wt % in the second resin layer.

In some embodiments, the metal complex salt dye and/or the organic black dye may have an average particle diameter (D50) of about 1 nm to about 30 nm.

In some embodiments, the second resin layer may have a light transmittance of about 50% to about 92% at a wavelength of 550 nm.

In some embodiments, the metal complex salt dye may include a black dye containing chromium (Cr), nickel (Ni), cobalt (Co), or copper (Cu).

In some embodiments, the metal complex salt dye may include a black dye containing chromium.

In some embodiments, the metal complex salt dye may include an azo-based dye.

In some embodiments, the metal complex salt dye may include an azo-based dye containing a $C_6$ to $C_{20}$ monocyclic or polycyclic aromatic functional group.

In some embodiments, the metal complex salt dye may include an azo-based dye containing chromium and a $C_6$ to $C_{20}$ monocyclic or polycyclic aromatic functional group, may have an average particle diameter (D50) of about 1 nm to about 30 nm, and may be present in an amount of about 0.01 wt % to about 10 wt % in the second resin layer.

In some embodiments, the organic black dye may include a first dye having a maximum absorption wavelength of about 430 nm to about 450 nm, a second dye having a maximum absorption wavelength of about 510 nm to about 530 nm, and a third dye having a maximum absorption wavelength of about 590 nm to about 610 nm.

In some embodiments, each of the first dye, the second dye, and the third dye may be or include an azo-based dye.

In some embodiments, the first dye may be represented by Formula 1; the second dye may be represented by Formula 2; and the third dye may be represented by Formula 3:

Formula 1

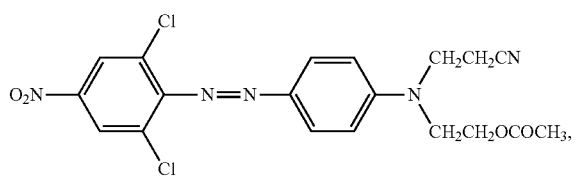

Formula 2

Formula 3

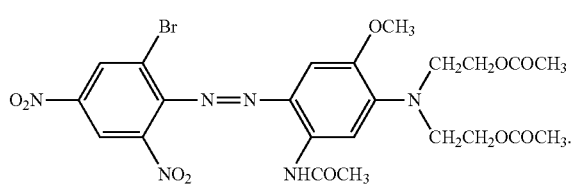

In some embodiments, the first resin layer may be an adhesive layer.

In some embodiments, the embossed optical pattern may have a trapezoidal, rectangular, and/or square-shaped cross-sectional shape.

According to one or more example embodiments of the present disclosure, a polarizing plate includes a polarizing film and the optical film according to embodiments of the present disclosure, where the optical film is positioned on the polarizing film, for example, on a light-exiting surface thereof.

According to one or more example embodiments of the present disclosure, a liquid crystal display includes the polarizing plate according to embodiments of the present disclosure.

BRIEF DESCRIPTION OF DRAWINGS

The above and other objects, features and advantages of the present disclosure will become more apparent to those of ordinary skill in the art by describing example embodiments thereof in more detail with reference to the accompanying drawings, in which.

DETAILED DESCRIPTION

Figure 1:
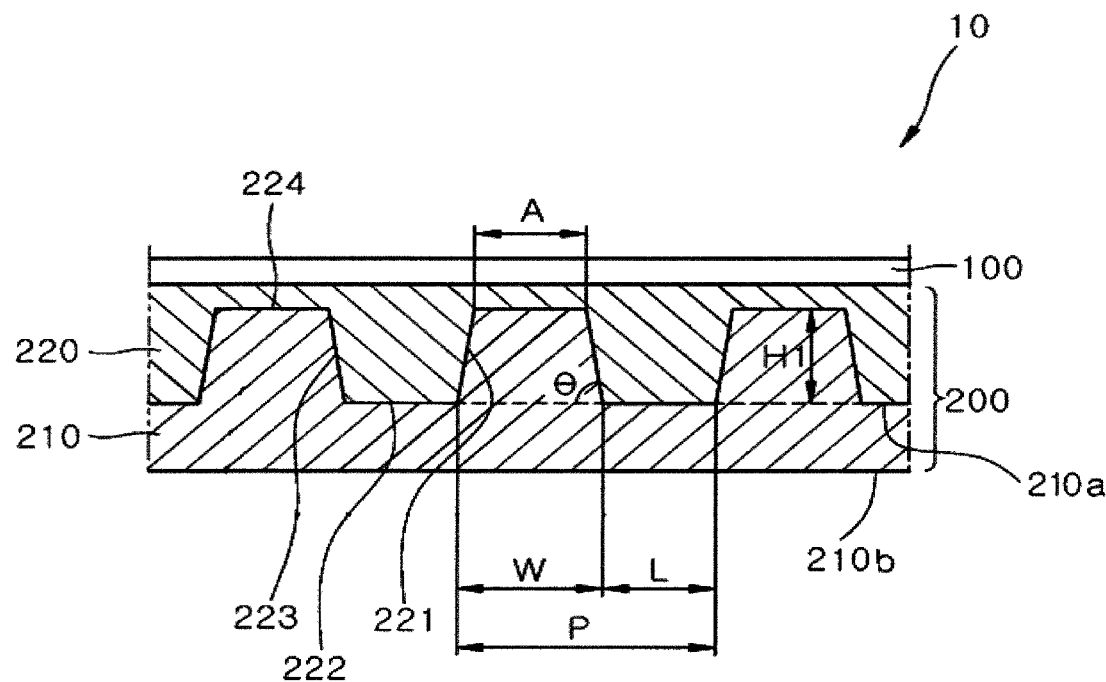
FIG. 1 is a sectional view of an optical film according to some embodiments of the present disclosure.

The above and other objects, features and advantages of embodiments of the present disclosure will be described in more detail with reference to the accompanying drawings to provide a thorough understanding of the disclosure to those skilled in the art. It should be understood that the present disclosure may be embodied in different ways, and is not limited to the following embodiments. In the drawings, portions irrelevant to the description may be omitted for clarity. Like components will be denoted by like reference numerals throughout the specification, and duplicative descriptions thereof may not be provided.

In the drawings, the thicknesses of layers, films, panels, regions, etc., may be exaggerated for clarity. As used herein, spatially relative terms such as "upper" and "lower" are defined with reference to the accompanying drawings. Thus, it will be understood that the term "upper surface" may be used interchangeably with the term "lower surface". It will be understood that when a layer or element is referred to as being "on" another layer or element, it may be directly formed on the other layer or element, or intervening layer(s) or element(s) may also be present. In contrast, when a layer or element is referred to as being "directly on" another layer or element, no intervening layers or elements are present.

As used herein, expressions such as "at least one of", "one of", and "selected from", when preceding a list of elements, modify the entire list of elements and do not modify the individual elements of the list. Further, the use of "may" when describing embodiments of the present disclosure refers to "one or more embodiments of the present disclosure".

Herein, the terms "horizontal direction" and "vertical direction" refer to a transverse direction and a longitudinal direction of a rectangular screen of a liquid crystal display, respectively. Herein, the terms "side" and "side surface" refer to a region in which θ ranges from 0° to 30° or from 0° to 60° in the spherical coordinate system represented by (ϕ, δ). The terms "front" and "front side" refer to a region indicated by (0°, 0°), a left end point is indicated by (180°, 90°), and a right end point is indicated by (0°, 90°) with reference to the horizontal direction.

Herein, the term "top portion" refers to the highest portion in an embossed optical pattern (e.g., a portion located at an uppermost portion of an embossed optical pattern).

Herein, "aspect ratio" refers to a ratio of the maximum height of an embossed optical pattern to the maximum width of the embossed optical pattern (maximum height/maximum width).

Herein, "pitch" refers to the sum of the maximum width W of one embossed optical pattern and the width L of one flat section (e.g., the distance between adjacent embossed optical patterns, for example, the sum of a maximum width of one embossed optical pattern and a width of one flat section immediately adjacent to the embossed optical pattern).

Herein, "in-plane retardation (Re)" is a value measured at a wavelength of 550 nm and is represented by Equation A:

$$Re=(nx-ny) \times d. \quad \text{Equation A}$$

In Equation A, nx and ny are the indices of refraction in the slow and fast axes of a corresponding protective layer or base layer at a wavelength of 550 nm, respectively, and d is the thickness (unit: nm) of the protective layer or base layer.

Herein, the term "(meth)acryl" refers to acryl and/or methacryl.

Herein, the term "average particle diameter (D50)" refers to a particle diameter of 50 wt % of particles distributed based on particle diameter, and may be measured using any suitable method available in the art.

According to one or more embodiments of the present disclosure, an optical film including a first resin layer, a second resin layer, and a patterned portion may improve front contrast ratio without affecting improvement in side contrast ratio (as mediated through the patterned portion), may achieve significant reduction in reflectance, and may reduce brightness at a side surface of an optical display in a black mode, for example, when a second resin layer having a lower index of refraction (e.g., compared to the first resin layer) includes a metal complex salt dye and/or an organic black dye. The optical film may reduce color shifting and increase the viewing angle of an optical display. The optical display may have reduced brightness at the side surface thereof in the black mode, and the optical display may have increased front relative brightness. In addition, compared to an optical film including a metal complex salt dye, an organic black dye, and/or an inorganic black pigment in a first resin layer having a higher index of refraction, the optical film according to embodiments of the present disclosure has high white brightness, thereby enabling a reduction in power by reducing the brightness of a backlight unit.

Hereinafter, an optical film according to one or more embodiments of the present disclosure will be described with reference to FIG. 1. FIG. 1 is a sectional view of an optical film according to one or more embodiments of the present disclosure.

Referring to FIG. 1, an optical film 10 includes a protective layer 100 and a contrast improving layer 200 formed on the protective layer 100.

Protective Layer

The protective layer 100 may be formed on one surface of the contrast improving layer 200 to support the contrast improving layer 200. The protective layer 100 may be directly formed on a second resin layer 220 of the contrast improving layer 200 to reduce the thickness of the optical film 10. As used herein, "directly formed" on another element or between elements indicates that an adhesive layer, bonding layer, or adhesive/bonding layer, etc. is not interposed between the protective layer 100 and the contrast improving layer 200. The contrast improving layer 200 is formed on a light incident surface of the protective layer 100.

The protective layer 100 may have a total visible light transmittance of about 90% or more, for example, about 90% to about 100%. Within this range of light transmittance, the protective layer 100 allows incident light to pass therethrough without affecting (e.g., the intensity of) the incident light.

The protective layer 100 may be a protective film or a protective coating layer, each having a light incident surface and a light exit surface opposite the light incident surface. For example, the protective layer may be a protective film to secure good support with respect to the contrast improving layer.

When the protective layer is a protective film, the protective layer may include a single layer of an optically transparent resin film. Alternatively, the protective layer may have a multilayer structure including multiple optically transparent resin films stacked one above another. The protective film may be formed through melting and extrusion of the resin. In some embodiments, the resin may be further subjected to stretching. The optically transparent resin may include at least one selected from among cellulose esters including triacetyl cellulose (TAC), cyclic polyolefin resins including amorphous cyclic olefin polymer (COP), polycarbonate resins, polyester resins including polyethylene terephthalate (PET), polyethersulfone resins, polysulfone resins, polyamide resins, polyimide resins, non-cyclic polyolefin resins, poly(meth)acrylic resins including poly(methyl methacrylate), polyvinyl alcohol resins, polyvinyl chloride resins, and polyvinylidene chloride resins.

The protective film may be a non-stretched film, a retardation film obtained by stretching a resin to have a set or predetermined range of retardation, or an isotropic optical film. In some embodiments, the protective film may be an isotropic optical film having an Re of about 60 nm or less, for example, about 0 nm to about 60 nm, or about 40 nm to about 60 nm. Within this range of Re, the protective film may provide good image quality by compensating for the viewing angle. Herein, the term "isotropic optical film" refers to a film having substantially the same nx, ny, and nz, and the expression "substantially the same" includes not only the case where nx, ny, and nz are completely the same, but also the case where there is an acceptable margin of error between nx, ny, and nz. In some embodiments, the protective film may be a retardation film having an Re of about 60 nm or more. For example, the protective film may have an Re of about 60 nm to about 500 nm, or about 60 nm to about 300 nm. In some embodiments, the protective film may have an Re of about 8,000 nm or more, about 10,000 nm or more, or greater than about 10,000 nm, for example, about 10,100 nm to about 30,000 nm, or about 10,100 nm to about 15,000 nm. Within this range, the protective film may prevent or reduce generation of rainbow spots while further diffusing light diffused by the contrast improving layer.

When the protective layer is a protective coating layer, the protective coating layer may be formed of an ultraviolet (UV)-curable resin composition including an UV-curable compound and a polymerization initiator. The UV-curable compound may include at least one selected from a cationic polymerizable curable compound, a radical polymerizable curable compound, a urethane resin, and a silicone resin. The cationic polymerizable curable compound may be an epoxy compound having at least one epoxy group per molecule, or an oxetane compound having at least one oxetane ring per molecule. The epoxy compound may include at least one selected from a hydrogenated epoxy compound, a chain-type aliphatic epoxy compound, a cyclic aliphatic epoxy compound, and an aromatic epoxy compound.

Non-limiting examples of the radical polymerizable curable compound may include a (meth)acrylate monomer having at least one (meth)acryloyloxy group per molecule and a (meth)acrylate oligomer obtained by reacting at least two functional group-containing compounds and having at least two (meth)acryloyloxy groups per molecule. Non-limiting examples of the (meth)acrylate monomer may include a monofunctional (meth)acrylate monomer having one (meth)acryloyloxy group per molecule, a bifunctional (meth)acrylate monomer having two (meth)acryloyloxy groups per molecule, and a polyfunctional (meth)acrylate monomer having three or more (meth)acryloyloxy groups per molecule. Non-limiting examples of the (meth)acrylate oligomer may include a urethane (meth)acrylate oligomer, a polyester (meth)acrylate oligomer, and an epoxy (meth)acrylate oligomer. The polymerization initiator may cure the UV-curable compound. The polymerization initiator may include at least one selected from a photocationic initiator and a photosensitizer. The photocationic initiator may include any suitable photocationic initiator available in the art.

The protective layer 100 may have a thickness of about 5 μm to about 200 μm, for example, about 30 μm to about 120 μm. In addition, the protective layer 100 having the form of a protective film may have a thickness of about 30 μm to about 100 μm, for example, about 50 μm to about 90 μm, and/or the protective layer 100 having the form of a protective coating layer may have a thickness of about 1 μm to about 50 μm. Within these thickness ranges, the protective layer 100 may be used in a polarizing plate.

A surface treatment layer (such as a primer layer, a hard coating layer, an anti-fingerprint layer, an anti-reflective layer, an anti-glare layer, a low reflectivity layer, and/or an ultralow reflectivity layer), may be further formed on at least one surface of the protective layer 100. The hard coating, the anti-fingerprint layer, the anti-reflective layer, and/or the like may provide additional functions to the protective layer, the polarizing film, and/or the like. The primer layer may improve adhesion between the protective layer and an adherend (for example, the contrast improving layer and/or a polarizer).

Contrast Improving Layer

The contrast improving layer 200 includes a first resin layer 210 and a second resin layer 220 facing the first resin layer 210. For example, the contrast improving layer 200 may consist of the first resin layer 210 and the second resin layer 220.

The first resin layer 210 is formed on a light incident surface of the second resin layer 220 such that light entering a lower surface of the first resin layer 210 may enter the second resin layer 220 through the first resin layer 210. The first resin layer 210 may diffuse light by allowing light having entered the lower surface thereof to exit the first resin layer 210 through refraction in one or more directions depending upon an incident location of light.

The first resin layer 210 is directly formed on the second resin layer 220 and includes a patterned portion at an interface between the first resin layer 210 and the second resin layer 220 (a lower surface of the second resin layer). FIG. 1 shows an embodiment in which the patterned portion completely contacts the second resin layer 220. In some embodiments, the patterned portion may contact at least part of the second resin layer 220. A non-contact portion between the second resin layer 220 and the first resin layer 210 may be filled with air, a resin containing air, or other material having a set or predetermined index of refraction.

The patterned portion may be composed of at least two embossed optical patterns 221 and a flat section 222 between adjacent embossed optical patterns 221. In the patterned portion, a combination of the embossed optical pattern 221 and the flat section 222 is repeatedly formed. The first resin layer 210 is composed of an upper surface 210a and a lower surface 210b. The upper surface 210a of the first resin layer 210 corresponds to the patterned portion at the interface between the first resin layer 210 and the second resin layer 220.

The patterned portion satisfies Equation 1, and the embossed optical patterns 221 may have a base angle $\theta$ of about 75° to about 90°. The base angle $\theta$ refers to an angle defined between an inclined surface 223 of the embossed optical pattern 221 and an imaginary line extending from a maximum width W of the embossed optical pattern 221. Here, the inclined surface 223 is an inclined surface directly connected to the flat section 222 of the embossed optical pattern 221. Within this range, the contrast improving layer may improve side contrast ratio and the contrast ratio at the same side viewing angle. In some embodiments, for example, the patterned portion may have a base angle $\theta$ of about 80° to about 90° and a value of P/W (ratio of P to W) of about 1.2 to about 8.

About 1<P/W≤about 10.    Equation 1

In Equation 1, P is a pitch (unit: μm) of the patterned portion, and W is the maximum width (unit: μm) of a corresponding one of the embossed optical patterns.

For example, the embossed optical pattern 221 may have a base angle δ of about 75°, 76°, 77°, 78°, 79°, 80°, 81°, 82°, 83°, 84°, 85°, 86°, 87°, 88°, 89°, 90°.

For example, the embossed optical pattern 221 may have a P/W of about 1, 2, 3, 4, 5, 6, 7, 8, 9, or 10.

Although FIG. 1 shows a structure in which the embossed optical patterns have the same base angle $\theta$ at both sides thereof, the embossed optical patterns may have different base angles $\theta$, as long as the base angle $\theta$ ranges from 75° to 90°, as needed.

The embossed optical pattern 221 may be an optical pattern including the first surface 224 formed at the top portion thereof and at least one inclined surface 223 connected to the first surface 224. Although FIG. 1 shows a trapezoidal optical pattern in which two adjacent inclined surfaces 223 are connected to each other via the first surface 224, it should be understood that embodiments of the present disclosure are not limited thereto. In some embodiments, for example, the embossed optical pattern may have a rectangular and/or square cross-sectional shape.

The first surface 224 is formed at the top portion of the embossed optical pattern, and may improve the viewing angle and/or brightness by further diffusing light reaching the second resin layer 220 in an optical display. Therefore, the optical film may improve light diffusion, thereby minimizing or reducing brightness loss. Accordingly, the optical film according to this embodiment may minimize or reduce brightness loss through improvement of light diffusion. The first surface 224 may be a flat surface to facilitate a process of manufacturing the optical film. In some embodiments, the first surface 224 may have fine roughness or a curved surface. When the first surface 224 is a curved surface, the embossed optical pattern may be realized by (e.g., may include) a lenticular lens pattern. Referring to FIG. 1, the embossed optical pattern has a trapezoidal cross-section (cross-sectional shape) in which the first surface formed at the top portion is a flat surface and the inclined surfaces are flat surfaces (for example, a truncated prism pattern having a truncated triangular cross-section, for example, a truncated prism shape or a cut-prism shape). In some embodiments, the embossed optical pattern may have a shape in which the first surface is formed at the top portion thereof and the inclined surfaces are curved surfaces (for example, a contrast improving layer having a truncated lenticular (cut-lenticular) lens pattern or a truncated microlens (cut-microlens) pattern). For example, the embossed optical pattern may have a square and/or rectangular cross-section. In some embodiments, the embossed optical pattern may include a pattern having an N-gonal cross-sectional shape (n being an integer of 3 to 20) including a rectangular or square cross-sectional shape.

The first surface 224 may be parallel to at least one selected from the flat section 222, the lowermost surface of the first resin layer 210, and the uppermost surface of the second resin layer 220 (for example, an upper surface of the second resin layer). FIG. 1 shows a structure in which the first surface 224 of the embossed optical pattern 221, the flat section 222, the lowermost surface of the first resin layer 210, and the uppermost surface of the second resin layer 220 are parallel to each other.

The first surface 224 may have a width A of about 0.5 μm to about 30 μm, for example, about 1 μm to about 15 μm. Within this range, the first surface 224 may be used for an optical display and may improve the contrast ratio.

The embossed optical patterns 221 may have an aspect ratio (H1/W) of about 0.1 to about 10, for example, about 0.1 to about 7, about 0.1 to about 5, or about 0.1 to about 1. Within this range, an optical display may exhibit improved an contrast ratio and/or viewing angle in a lateral direction.

The embossed optical patterns 221 may have a maximum height H1 of about 20 µm or less, for example, about 15 µm or less, or about 10 µm or less. Within this range, an optical display may exhibit an improvement in contrast ratio, viewing angle and/or brightness without suffering from the Moiré phenomenon and/or the like.

The embossed optical patterns 221 may have a maximum width W of about 20 µm or less, for example, about 15 µm or less, or about 10 µm or less. Within this range, an optical display may exhibit improvement in contrast ratio, viewing angle, and/or brightness without suffering from the Moiré phenomenon and/or the like.

Although FIG. 1 shows a structure in which adjacent embossed optical patterns of the patterned portion have the same base angle, the same first surface width, the same maximum height, and the same maximum width, in some embodiments, the adjacent embossed optical patterns may have different base angles, different first surface widths, different maximum heights, and/or different maximum widths.

Upon receiving light from the first resin layer 210, the flat section 222 emits (transmits) the light to the second resin layer 220, thereby improving front brightness.

A ratio (W/L) of the maximum width W of the embossed optical pattern 221 to the width L of the flat section 222 may be about 9 or less, for example, about 0.1 to about 3, or about 0.15 to about 2. Within this range of the maximum width, the optical film may reduce a difference between front contrast ratio and side contrast ratio, while improving the contrast ratio at the same side viewing angle and at the same front viewing angle. In addition, the optical film may prevent or reduce the Moiré phenomenon. The flat section 222 may have a width L of about 1 µm to about 50 µm, for example, about 1 µm to about 20 µm. Within this range, the optical film may improve front brightness.

The maximum width W of one embossed optical pattern 321 and the flat section 322 directly adjacent thereto form one pitch P. The pitch P may be about 1 µm to about 50 µm, for example, about 1 µm to about 40 µm. Within this range, the optical pattern may improve brightness and contrast ratio without causing the Moiré phenomenon.

Although FIG. 1 shows a structure in which adjacent embossed optical patterns of the patterned portion have the same pitch and the same maximum width, in some embodiments, the adjacent embossed optical patterns may have different pitches and different maximum widths.

The first resin layer 210 may have an index of refraction of about 1.50 or more, for example, about 1.55 to about 1.70. Within this range, the optical film may promote light diffusion, may be easily fabricated, and/or may provide significant improvement in diffusion of polarized light and/or contrast ratio.

The first resin layer 210 may be formed of a composition for the first resin layer, which includes a curable compound. The composition for the first resin layer may further include an initiator. The curable compound and/or the initiator may be the same as those included in a composition for the second resin layer. The composition for the first resin layer may further include the same additives included in the composition for the second resin layer.

The first resin layer 210 may be a non-adhesive layer exhibiting no adhesion. In this case, the optical film may be stacked on an adherend (for example, a polarizing film) with an intervening adhesive agent, bonding agent, or adhesive/bonding agent. In some embodiments, the first resin layer 210 may be adhesive (e.g., may be an adhesive layer, or may have adhesive properties). In this case, the first resin layer 210 may be directly formed on the protective layer 200. When the first resin layer 210 is self-adhesive, the optical film may be stacked (e.g., directly stacked) on an adherend (for example, a polarizing film) without an additional adhesive agent, bonding agent or adhesive/bonding agent, thereby enabling thickness reduction of the optical film.

FIG. 1 shows a structure in which the embossed optical patterns extend in a stripe shape. In some embodiments, the embossed optical patterns may be formed in a dot shape. Herein, the term "dot shape" refers to that the embossed optical patterns are dispersed. In some embodiments, the embossed optical patterns extend in the stripe shape to enlarge viewing angle at the right and left sides.

The second resin layer 220 may have a lower index of refraction than the first resin layer 210. As such, when light enters a light incident surface of the first resin layer 210, the contrast improving layer 200 diffuses and emits the light, thereby improving the side contrast ratio while minimizing or reducing any decrease in the front contrast ratio, reducing a difference between the front contrast ratio and the side contrast ratio, and/or improving the contrast ratio at the same side viewing angle and the same front viewing angle. A difference in index of refraction between the first resin layer 210 and the second resin layer 220 may be about 0.05 or more, for example, about 0.05 to about 0.3, or about 0.05 to about 0.2. Within this range, the optical film may provide a significant effect in diffusion of collected light while improving the contrast ratio.

The second resin layer 220 may have an index of refraction of less than about 1.52, for example, about 1.35 to less than about 1.50. Within this range, the optical film may have a good effect on light diffusion.

The second resin layer 220 may be formed of the composition for the second resin layer, which includes a metal complex salt dye and/or an organic black dye; and a curable resin.

The metal complex salt dye and/or the organic black dye may include a black dye dispersion having an average particle diameter D50 of about 30 nm or less, for example, about 1 nm to about 30 nm, or about 5 nm to about 10 nm. In some embodiments, the average particle diameter of the metal complex salt dye and/or the organic black dye is much smaller than the maximum width of the embossed optical pattern and the width of the flat section. For example, the ratio of the average particle diameter of the metal complex salt dye and/or the organic black dye to each of the maximum width of the embossed optical pattern and the width of the flat section may be about 1:300 to about 1:800. Within this range of average particle diameter, the optical film may obtain the beneficial features of the present disclosure.

When the metal complex salt dye and/or the organic black dye have an average particle diameter within the above range, the second resin layer 220 may improve the front contrast ratio and may reduce reflectance and brightness at a side surface of an optical display in a black mode.

When the metal complex salt dye and/or the organic black dye having an average particle diameter within the above range is present between adjacent embossed optical patterns, the metal complex salt dye and/or the organic black dye does not affect light emitted from the flat section of the first resin layer, thereby improving the front contrast ratio, and/or does not affect light emitted from the side surface of the embossed optical patterns, thereby allowing the side contrast ratio to be improved via the patterned portion. In addition, with the metal complex salt dye and/or the organic black dye, the composition for the second resin layer may improve front contrast ratio while reducing reflectance increased due to increase in the number of layers. In addition, the composition for the second resin layer may improve black visibility, which may be reduced due to side light leakage of an LCD panel. As measured on the protective layer of the optical film, the LCD panel may have a reflectance of about 5% or less, for example, about 4.9% or less. Within this range, the optical film may reduce reflectance of an optical display, thereby improving external appearance.

In some embodiments, the metal complex salt dye and/or the organic black dye may be present in an amount of about 0.01 wt % to about 10 wt %, for example, about 0.01 to about 3 wt %, about 0.01 wt % to about 1 wt %, or about 0.01 wt % to about 0.5 wt %, in the second resin layer. Within this range, the metal complex salt dye and/or the organic black dye may improve the front contrast ratio, reflectance, and/or black visibility, and may be suitably provided to the second resin layer.

The second resin layer may have a light transmittance of about 50% to about 92%, for example, about 75% to about 85%, at a wavelength of 550 nm. Within this range, the second resin layer may improve the side contrast ratio via the patterned portion and the front contrast ratio via the metal complex salt dye.

Next, the metal complex salt dye will be described in more detail.

The metal complex salt dye may be a metal-containing black dye. The metal may include at least one selected from chromium (Cr), nickel (Ni), cobalt (Co), and copper (Cu). The metal complex salt dye may be or include a 1:1 metal complex salt dye and/or a 1:2 metal complex salt dye. The term "1:1 metal complex salt dye" refers to a metal complex salt dye in which one metal element is coupled to one dye molecule (ligand), and the term "1:2 metal complex salt dye" refers to a metal complex salt dye in which one metal element is coupled to two dye molecules. The dye molecules may include an azo-based compound (for example, monoazo-based compound) containing a hydroxyl, carboxyl or amino group. As a result, the second resin layer may improve the side contrast ratio via the patterned portion, the front contrast ratio via the metal complex salt dye, and/or black visibility, while also reducing reflectance.

In some embodiments, the metal complex salt dye may be a metal-containing azo-based dye and may contain a $C_6$ to $C_{20}$ monocyclic or polycyclic aromatic functional group. For example, the metal complex salt dye may contain a $C_8$ to $C_{15}$ monocyclic or polycyclic aromatic functional group, for example, a phenyl group or a naphthalene group, as the monocyclic or polycyclic aromatic functional group. As a result, during mixing with a UV curable resin contained in the composition for the second resin layer, the metal complex salt dye may allow efficient mixing with the UV curable resin, thereby improving the hardness of the second resin layer while preventing or reducing the metal complex salt dye from being separated from the second resin layer.

In some embodiments, the metal complex salt dye may be composed of one type or kind of dye. In another embodiment, the metal complex salt dye may be composed of a mixture of a red metal complex salt dye, a green metal complex salt dye, and a blue metal complex salt dye.

The metal complex salt dye may have an index of refraction of about 1.6 to about 2.2, for example, about 1.9 to about 2.1. Within this range, the metal complex salt dye does not affect the index of refraction when contained in the second resin layer.

The metal complex salt dye may be a commercially available product, but embodiments of the present disclosure are not limited thereto. For example, the metal complex salt dye may include at least one selected from Orasol® Black X55 (BASF, Ludwigshafen, Germany) and Orasol® Black X51 (BASF).

Next, the organic black dye will be described in more detail.

The organic black dye may be a non-metallic black dye that is metal-free and has good properties in terms of dispersibility (minimum dispersion unit: 1 to 5 nm), transparency, and brightness. In contrast, an inorganic black pigment (such as carbon black) exhibits poor dispersibility (minimum dispersion unit: 50 to 400 nm) and is opaque. The optical film according to the present disclosure should be paired with a dye having a scale dispersion size on the order of several nanometers, suitable for a micro-pattern size, and should be a solvent-free film for an imprinting process. Thus, since the optical film according to the present disclosure should have good dispersibility and high transmittance while reducing brightness in a black mode, in some embodiments, the organic black dye is preferred to carbon black and other inorganic black pigments.

The organic black dye may have an index of refraction of about 1.6 to about 2.2, for example, about 1.9 to about 2.1. Within this range, the organic black dye does not affect the index of refraction when contained in the second resin layer.

The organic black dye may be a commercially available product, but embodiments of the present disclosure are not limited thereto.

In some embodiments, the organic black dye is a mixture of three-color dyes, and may be a mixture of a first dye (orange color dye), a second dye (red color dye), and a third dye (blue color dye). The first dye may have a maximum absorption wavelength of about 430 nm to about 450 nm, for example, about 440 nm, and may include a dye having an absorption wavelength of about 360 nm to about 640 nm. The second dye may have a maximum absorption wavelength of about 510 nm to about 530 nm, for example, about 520 nm, and may include a dye having an absorption wavelength of about 360 nm to about 740 nm. The third dye may have a maximum absorption wavelength of about 590 nm to about 610 nm, for example, about 600 nm, and may include a dye having an absorption wavelength of about 360 nm to about 740 nm. Herein, the "maximum absorption wavelength" is a value measured with respect to each dye in 5 mg/L (5 wt %) of methylethylketone as a solvent. This concentration may be regarded as being suitable for measurement of transmittance.

In some embodiments, the organic black dye may be a mixture of about 30 wt % to about 50 wt %, for example, about 40 wt % to about 50 wt %, of the first dye; 1 wt % to about 20 wt %, for example, about 1 wt % to about 10 wt %, of the second dye; and about 30 wt % to about 50 wt %, for example, about 40 wt % to about 50 wt %, of the third dye. Within these ranges, the organic black dye may exhibit high brightness.

The first dye (orange color dye) is an azo-based dye, for example, a dye (Synolon yellow Brown K-2RS, Kyung-In Synthetic Co., Incheon, Korea) represented by Formula 1:

Formula 1

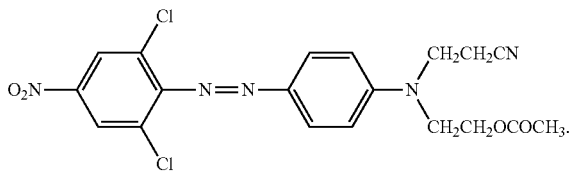

The second dye (red color dye) is an azo-based dye, for example, a dye (Synolon rubine K-GFL, Kyung-In Synthetic Co.) represented by Formula 2:

Formula 2

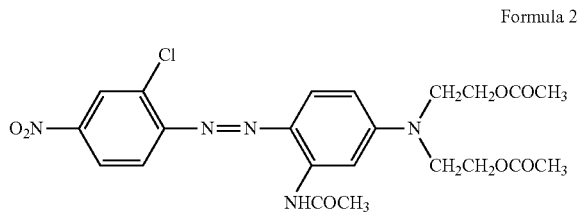

The third dye (blue color dye) is an azo-based dye, for example, a dye (Synolon navy blue K-GLS, Kyung-In Synthetic Co.) represented by Formula 3:

Formula 3

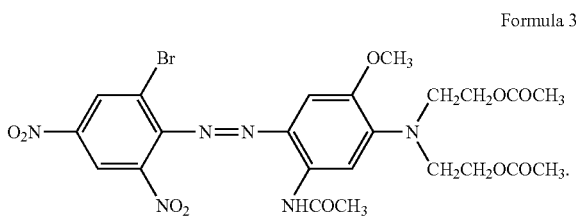

The organic black dye may be a commercially available product, but embodiments of the present disclosure are not limited thereto. For example, the organic black dye may include BS01 (Kyung-In Synthetic Co.), BS02 (Kyung-In Synthetic Co.), and/or the like.

The curable compound may include at least one selected from a UV curable compound and a heat curable compound. For example, the curable compound may be a UV curable compound to allow rapid formation of the second resin layer and to provide a good pattern shape in formation of the pattern. The curable compound may include a (meth)acrylic monomer, an oligomer thereof, or a resin thereof.

The curable compound may have an index of refraction after curing of less than about 1.52, for example, about 1.35 to less than about 1.50. Within this range, the curable compound may secure a desired or suitable index of refraction for the second resin layer.

The composition for the second resin layer may further include an initiator. The initiator serves to cure the curable resin, and may include at least one selected from a photoinitiator and a heat initiator. The initiator may be any suitable initiator available in the art. The photoinitiator may include at least one selected from phosphorus, triazine, acetophenone, benzophenone, thioxanthone, benzoin, oxime, and phenylketone initiators. The initiator may be present in an amount of about 5 wt % or less, for example, about 2 wt % to about 5 wt %, in the second resin layer or in the composition for the second resin layer in terms of solid content. Within this range, the initiator may sufficiently cure the composition for the second resin layer without deterioration in transmittance of the contrast improving layer due to residual initiator.

For coatability of the composition for the second resin layer, the composition may further include any suitable solvent, for example, ethanol (EtOH), propylene glycol monomethyl ether acetate (PGME), methylethylketone (MEK), and methylisobutylketone (MIBK), but embodiments of the present disclosure are not limited thereto.

The composition for the second resin layer may further include any suitable additive available in the art. The additives may include at least one selected from a leveling agent, a surface modifier, an antioxidant agent, an anti-foaming agent, a UV absorbent, and a photostabilizer.

The second resin layer 220 may have a maximum thickness of about 30 μm or less, for example, about 20 μm or less. Within this thickness range of the second resin layer, the optical film may prevent or reduce warpage such as curling.

A value obtained by subtracting the maximum height of the embossed optical pattern 221 from the maximum thickness of the second resin layer 220 (the maximum thickness of the second resin layer 220—the maximum height of the embossed optical pattern 221) (also referred to as "net thickness") may be about 30 μm or less, for example, about 20 μm or less, or about 10 μm or less. Within this range, the optical film may have an effect of minimizing or decreasing deterioration in the side contrast ratio.

Like the first resin layer, the second resin layer 220 may be an adhesive or non-adhesive layer.

The contrast improving layer 200 may have a thickness of about 10 μm to about 100 μm, for example, about 10 μm to about 50 μm, or about 10 μm to about 40 μm. Within this thickness range, the contrast improving layer may be used for an optical display.

The contrast improving layer may be formed using any suitable method available in the art. For example, the contrast improving layer may be formed by coating the composition for the second resin layer onto the protective layer, applying embossed optical patterns and flat sections and curing to form the second resin layer, followed by coating the composition for the first resin layer onto the second resin layer and curing, but embodiments of the present disclosure are not limited thereto.

Figure 2:
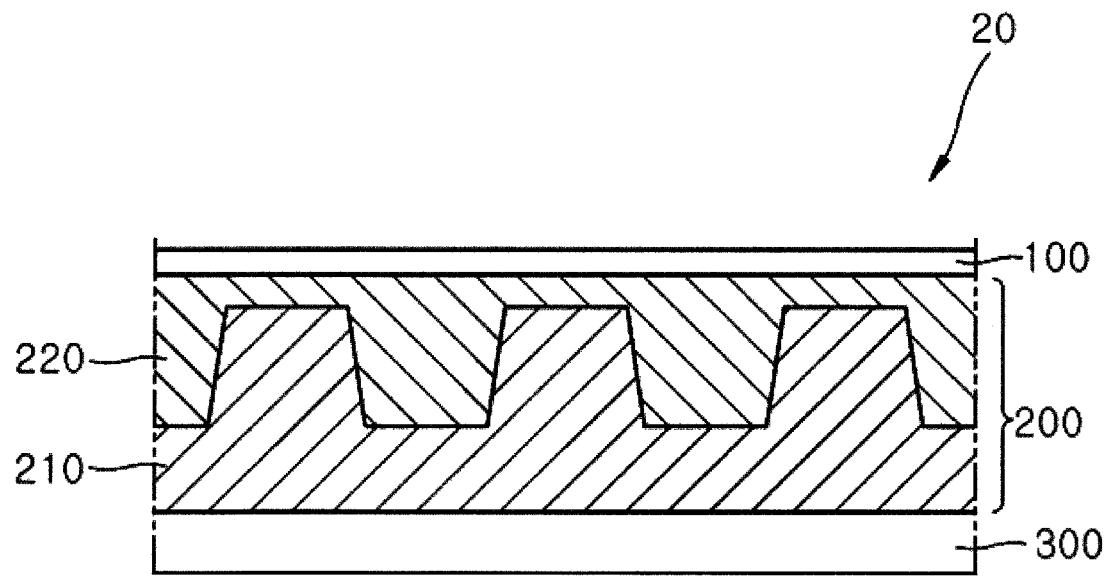
FIG. 2 is a sectional view of a polarizing plate according to some embodiments of the present disclosure.

Next, a polarizing plate according to one or more embodiments of the present disclosure will be described with reference to FIG. 2. FIG. 2 is a sectional view of a polarizing plate according to one or more embodiments of the present disclosure.

Referring to FIG. 2, the polarizing plate 20 according to one or more embodiments of the present disclosure includes a polarizing film 300 and a contrast improving film (layer) 200, which may include the optical film according to embodiments of the present disclosure. The optical film may be formed on a light exit surface of the polarizing film 300. The optical film may diffuse polarized light that has passed through the polarizing film 300, thereby improving the front contrast ratio, side contrast ratio, viewing angle, and/or black visibility.

The polarizing film 300 may polarize and transmit light received from a liquid crystal panel toward the contrast improving layer 200. The polarizing film 300 may be formed on a light incident surface of the contrast improving layer 200.

The polarizing film 300 may include a polarizer. For example, the polarizer may include a polyvinyl alcohol polarizer obtained by uniaxially stretching a polyvinyl alcohol film, or a polyene-based polarizer obtained by dehydrating a polyvinyl alcohol film. The polarizer may have a thickness of about 5 μm to about 40 μm. Within this range, the polarizing film 300 may be used for an optical display.

The polarizing film 300 may include the polarizer and a protective layer formed on at least one surface of the polarizer. The protective layer protects the polarizer, thereby improving reliability and/or mechanical strength of the polarizing plate. The protective layer may include at least one selected from an optically transparent protective film and an optically transparent protective coating layer. The protective layer is the same as described above.

The polarizing plate may be fabricated using any suitable method.

In some embodiments, the polarizing plate may be fabricated by forming the optical film using the method described above, followed by bonding the polarizing film to the other surface of the first resin layer of the optical film. Bonding of the polarizing film may be performed using any suitable bonding agent, such as a water-based bonding agent and/or a photocurable bonding agent.

In some embodiments, the polarizing plate may be fabricated by forming a first resin layer through deposition of the composition for the first resin layer on one surface of the polarizing film, application of embossed optical patterns and flat sections thereto, and curing, followed by deposition of the composition for the second resin layer, placing the protective layer, and curing, but embodiments of the present disclosure are not limited thereto.

According to the present disclosure, a liquid crystal display may include the polarizing plate according to embodiments of the present disclosure. In some embodiments, the liquid crystal display may include the polarizing plate at the viewer side with respect to a liquid crystal panel. Herein, the term "polarizing plate at the viewer side" refers to a polarizing plate placed on the side of a screen of the liquid crystal panel, for example, on a side of the liquid crystal panel opposite a light source.

In some embodiments, the liquid crystal display may include a backlight unit, a first polarizing plate, the liquid crystal panel, and a second polarizing plate, which are stacked in the stated order, wherein the second polarizing plate may include the polarizing plate according to the present disclosure. The liquid crystal panel may employ a vertical alignment (VA) mode, an IPS mode, a patterned vertical alignment (PVA) mode, or a super-patterned vertical alignment (S-PVA) mode, but embodiments of the present disclosure are not limited thereto. In some embodiments, the liquid crystal display may include the polarizing plate at a light source side. Herein, the term "polarizing plate at the light source side" refers to a polarizing plate positioned at the light source side with respect to the liquid crystal panel. In some embodiments, both the polarizing plate at the viewer side and the polarizing plate at the light source side with respect to the liquid crystal panel may (e.g., simultaneously) include the polarizing plates according to the present disclosure.

One or more example embodiments of the present disclosure provide an optical film that may improve front contrast ratio while reducing reflectance.

One or more example embodiments of the present disclosure provide an optical film that may reduce brightness at a side surface of an optical display in a black mode.

Next, the present disclosure will be described in more detail with reference to example embodiments. However, it should be noted that these examples are provided for illustration only and should not be construed in any way as limiting the present disclosure.

Example 1

40 parts by weight of methylethylketone as a dilution solvent and 0.15 parts by weight of Orasol® Black X55 (a powdered 1:2 complex salt of Cr:azo-based compound having an average particle diameter (D50) of 10 nm, BASF) were mixed, followed by stirring at 1,000 rpm for 1 hour using a stirrer. Then, 100 parts by weight of an adhesive acrylic copolymer (PL8540, SAIDEN, Tokyo, Japan) was added to the mixture and mixed with 40 parts by weight of methylethylketone as a dilution solvent, followed by stirring at 2,000 rpm for 1 hour using a stirrer, thereby preparing a composition for a second resin layer.

A UV curable resin (SSC-5760, SHIN-A T&C Co., Ltd., Seoul, Korea) was used as a resin for a first resin layer, which is a highly reflective layer.

The resin for the first resin layer was deposited on one surface of a PET film of a polarizing film (AMN-6143CPS (CO), Samsung SDI, Yong-in, Korea) having a trilayer structure of PET/PVA/COP to form a coating layer. Then, a film having embossed optical patterns and flat sections alternately formed thereon was applied to the coating layer to form embossed optical patterns and flat sections on the coating layer, followed by UV curing at 500 mJ/cm², thereby forming a first resin layer including a patterned portion. Table 1 shows specifications of the patterned portion formed on a contrast improving layer.

Next, the prepared composition for the second resin layer was deposited on the patterned portion of the first resin layer to form a coating layer. As a protective film, a polyethylene terephthalate (PET) film (TA044, thickness: 80 μm, Toyobo Co., Ltd., Osaka, Japan) was bonded to one surface of the coating layer and cured in a drying oven at 90° C. for 4 minutes to form a second resin layer, thereby preparing a polarizing plate having an optical film formed thereon.

Example 2

An optical film and a polarizing plate were fabricated in substantially the same manner as in Example 1, except that 0.3 parts by weight of Orasol® Black X55 was used in place of Orasol® Black X55 in preparation of the composition for the second resin layer.

Example 3

An optical film and a polarizing plate were fabricated in substantially the same manner as in Example 1, except that 0.15 parts by weight of Orasol® Black X51 (1:2 complex salt of Cr:azo-based compound having an average particle diameter (D50) of 10 nm, BASF) was used in place of Orasol® Black X55 in preparation of the composition for the second resin layer.

Example 4

An optical film and a polarizing plate were fabricated in substantially the same manner as in Example 1, except that 0.3 parts by weight of Orasol® Black X51 was used in place of Orasol® Black X55 in preparation of the composition for the second resin layer.

Example 5

An optical film and a polarizing plate were fabricated in substantially the same manner as in Example 1 except that 0.15 parts by weight of BS01 (Kyung-In Synthetic Co., powder) as an organic black dye was used in place of Orasol® Black X55 in preparation of the composition for the second resin layer. The organic black dye had an average particle diameter (D50) of 10 nm and was a mixture of three-color organic dyes prepared by mixing 45 wt % of Synolon yellow brown K-2RS (Kyung-In Synthetic Co.) for an orange color, 10 wt % of Synolon rubine K-GFL (Kyung-In Synthetic Co.) for a red color, and 45 wt % of Synolon navy blue K-GLS (Kyung-In Synthetic Co.) for a blue color.

Example 6

An optical film and a polarizing plate were fabricated in substantially the same manner as in Example 1, except that 0.3 parts by weight of BS01 (Kyung-In Synthetic Co., powder) as an organic black dye was used in place of Orasol® Black X55 in preparation of the composition for the second resin layer.

Comparative Example 4

An optical film and a polarizing plate were fabricated in substantially the same manner as in Comparative Example 3, except that 0.3 parts by weight of Orasol® Black X55 was used in place of Orasol® Black X55 in preparation of the composition for the first resin layer.

Comparative Example 5

An optical film and a polarizing plate were fabricated in substantially the same manner as in Comparative Example 3, except that 0.4 parts by weight of a carbon black dispersion (CI-M-400) was used in place of Orasol® Black X55 in preparation of the composition for the first resin layer.

TABLE 1

| Shape of embossed optical pattern | Maximum height (H1) of embossed optical pattern (μm) | Maximum width (W) of embossed optical pattern (μm) | Width (W) of first surface of embossed optical pattern (μm) | Base angle of embossed optical patterns (°) | Width (L) of flat section (μm) | Pitch (P) (μm) |
|---|---|---|---|---|---|---|
| Cut-prism (trapezoidal, embossed pattern) | 5 | 8 | 6.7 | 86 | 7 | 15 |

Comparative Example 1

A polarizing film (AMN-6143CPS (CO), Samsung SDI) having a structure of PET/PVA/COP and not including an optical film was used (e.g., was used without an optical film).

Comparative Example 2

An optical film and a polarizing plate were fabricated in substantially the same manner as in Example 1, except that Orasol® Black X55 was not used in preparation of the composition for the second resin layer.

Comparative Example 3

A composition for the second resin layer was prepared by mixing 100 parts by weight of an adhesive acrylic copolymer (PL8540, SAIDEN) with 80 parts by weight of methylethylketone as a dilution solvent, followed by stirring at 500 rpm for 30 minutes using a stirrer.

A composition for the first resin layer was prepared by mixing 100 parts by weight of a UV curable resin (SSC-5760, SHIN-A T&C Co., Ltd.) with 0.15 parts by weight of Orasol® Black X55, followed by stirring at 2,000 rpm for 2 hours.

A polarizing plate including an optical film formed thereon was fabricated in substantially the same manner as in Example 1, using the composition for the first resin layer and the composition for the second resin layer.

The following properties were evaluated on the optical films and the polarizing plates prepared in the Examples and Comparative Examples, and the evaluation results are shown in Tables 2 and 3.

Panel reflectance: An optical film bonded to each of the polarizing plates prepared in the Examples and Comparative Examples was attached to an LCD VN type SUHD 55" liquid crystal panel (Samsung Electronics Co., Ltd.) using an adhesive having an index of refraction of 1.46 to 1.50. The reflectance was then measured in an SCI reflection mode (light source: D65 light source) at a wavelength of 320 nm to 800 nm using a spectrophotometer (CM-2600D, Konica Minolta Co., Ltd.) to obtain Y (D65) values.

Fabrication of Polarizing Plate at Light Source Side

A polarizer was fabricated by stretching a polyvinyl alcohol film to 3 times an initial length thereof at 60° C., and adsorbing iodine to the stretched film, followed by stretching the film to 2.5 times the stretched length of the film in an aqueous solution of boric acid at 40° C. As a base layer, a triacetylcellulose film (thickness: 80 μm) was bonded (e.g., simultaneously) to both surfaces of the first polarizer using a bonding agent (Z-200, Nippon Gohsei Co., Ltd.) for polarizing plates, thereby fabricating a polarizing plate. The fabricated polarizing plate was used as a polarizing plate at a light source side.

Fabrication of Module for Liquid Crystal Displays

The fabricated polarizing plate at the light source side, a liquid crystal panel (PVA mode), and each of the polarizing plates fabricated in the Examples and Comparative Examples were assembled in the stated order, thereby providing a module for liquid crystal displays. Here, each of the polarizing plates prepared in the Examples and Comparative Example was assembled thereto such that the protective layer of the polarizing plate was placed at the outermost side of the module.

A LED light source, a light guide plate, and the module for liquid crystal displays were assembled, thereby providing a liquid crystal display (which had the same configuration as a Samsung LED TV (55", Model: UN55KS8000F)

except for using each of the modules for liquid crystal displays of Examples and Comparative Examples) including a one-side edge LED light source.

Brightness was measured in each of a white mode and a black mode at each of coordinates (0°, 0°) and coordinates (0°, 30°) and (0°, 60°) in the spherical coordinate system using EZCONTRAST X88RC (EZXL-176R-F422A4, ELDIM Co., Ltd., Hérouville-Saint-Clair, France).

Front contrast ratio was calculated as a ratio of brightness in the white mode to brightness in the black mode at the coordinates (0°, 0°) in the spherical coordinate system. Side contrast ratio was calculated as a ratio of brightness in the white mode to brightness in the black mode at the coordinates (0°, 30°) and (0°, 60°) in the spherical coordinate system.

Front relative brightness in a white mode was calculated as the ratio of brightness of each of modules of Examples and Comparative Examples to brightness of the module of Comparative Example 1 in the white mode. Front relative brightness in a black mode was calculated as the ratio of the brightness of each of the Examples and Comparative Examples to the brightness of Comparative Example 1 in the black mode. Side relative brightness in the black mode was calculated in substantially the same manner.

TABLE 2

| | | Example | | | | | |
|---|---|---|---|---|---|---|---|
| | Item | 1 | 2 | 3 | 4 | 5 | 6 |
| Second resin layer | Index of refraction | 1.484 | 1.485 | 1.483 | 1.485 | 1.484 | 1.485 |
| | Content of X55 (wt %) | 0.15 | 0.3 | 0 | 0 | 0 | 0 |
| | Content of X51 (wt %) | 0 | 0 | 0.15 | 0.3 | 0 | 0 |
| | Content of organic black dye (wt %) | 0 | 0 | 0 | 0 | 0.15 | 0.3 |
| First resin layer | Index of refraction | 1.572 | 1.572 | 1.572 | 1.572 | 1.572 | 1.572 |
| Front relative brightness (%) | @ white mode | 96 | 94 | 97 | 95 | 96 | 94 |
| | @ black mode | 130 | 125 | 131 | 128 | 128 | 125 |
| Contrast ratio (%) | @ (0°, 0°) | 74 | 75 | 74 | 74 | 75 | 75 |
| | @ (0°, 30°) | 40 | 39 | 40 | 40 | 40 | 39 |
| | @ (0°, 60°) | 23 | 24 | 24 | 24 | 23 | 24 |
| Side relative brightness @ black mode (0°, 60°) (%) | | 0.309 | 0.311 | 0.310 | 0.309 | 0.311 | 0.310 |
| Panel reflectance (%) | | 4.82 | 4.62 | 4.81 | 4.61 | 4.83 | 4.60 |

TABLE 3

| | | Comparative Example | | | | |
|---|---|---|---|---|---|---|
| | Item | 1 | 2 | 3 | 4 | 5 |
| First resin layer | Index of refraction | — | 1.572 | 1.574 | 1.576 | 1.575 |
| | Content of X55 (wt %) | — | 0 | 0.15 | 0.3 | 0 |
| | Content of carbon black (wt %) | — | 0 | 0 | 0 | 0.4 |
| Second resin layer | Index of refraction | — | 1.482 | 1.482 | 1.482 | 1.482 |
| Front relative brightness (%) | @ white mode | 100 | 93 | 92 | 87 | 86 |
| | @ black mode | 100 | 135 | 124 | 116 | 119 |
| Contrast ratio (%) | @ (0°, 0°) | 100 | 69 | 74 | 75 | 72 |
| | @ (0°, 30°) | 34 | 40 | 41 | 41 | 40 |
| | @ (0°, 60°) | 17 | 23 | 24 | 23 | 23 |
| Side relative brightness @ black mode (0°, 60°) (%) | | 0.36 | 0.337 | 0.326 | 0.327 | 0.329 |
| Panel reflectance (%) | | 4.95 | 5.18 | 4.80 | 4.61 | 4.84 |

As shown in Tables 2 and 3 (e.g., by the improved performance of the Examples in Table 2 compared to the Comparative Examples in Table 3), the optical film according to embodiments of the present disclosure could reduce reflectance while improving the front contrast ratio and side contrast ratio. In addition, the optical film according to embodiments of the present disclosure may improve the front relative brightness and the front contrast ratio by reducing the side relative brightness.

In contrast, the optical film of Comparative Example 2 (in which the second resin layer and the first resin layer each do not include the metal complex salt dye and/or the organic black dye) exhibited high reflectance and high side relative brightness in the black mode. Further, each of the optical films of Comparative Examples 3 to 5 (in which the metal complex salt dye and/or the organic black dye is included in the first resin layer instead of the second resin layer) exhibited high side relative brightness in the black mode, as well as lower front and side contrast ratios, compared to each of the optical films of the Examples.

As used herein, the terms "use", "using", and "used" may be considered synonymous with the terms "utilize", "utilizing", and "utilized", respectively.

As used herein, the terms "substantially", "about", and similar terms are used as terms of approximation and not as terms of degree, and are intended to account for the inherent deviations in measured or calculated values that would be recognized by those of ordinary skill in the art.

Also, any numerical range recited herein is intended to include all subranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

It should be understood that various modifications, changes, alterations, and equivalent embodiments may be made by those skilled in the art without departing from the spirit and scope of the present disclosure, as defined by the following claims and equivalents thereof.

What is claimed is:

1. An optical film comprising:
a protective layer; and
a contrast improving layer;
wherein the contrast improving layer comprises a first resin layer and a second resin layer facing the first resin layer, the second resin layer and the first resin layer being sequentially stacked from the protective layer, wherein the second resin layer has a lower index of refraction than the first resin layer,
the first resin layer has a patterned portion with at least two embossed optical patterns and a flat section between and adjacent to the at least two embossed optical patterns, the patterned portion being in at least some region of the first resin layer facing the second resin layer and satisfying Equation 1,
a corresponding one of the embossed optical patterns having a base angle θ of about 75° to about 90°, and
the second resin layer comprising a metal complex salt dye and/or an organic black dye, the metal complex salt dye comprising a black dye in an absence of the organic black dye:

$$\text{about } 1 < P/W \leq \text{about } 10, \quad \text{Equation 1}$$

wherein, in Equation 1, P is a pitch (unit: μm) of the patterned portion, and W is a maximum width (unit: μm) of a corresponding one of the embossed optical patterns, and wherein the second resin layer has a light transmittance of about 50% to about 92% at a wavelength of 550 nm.

2. The optical film according to claim 1, wherein the corresponding one of the embossed optical patterns has an aspect ratio (H1/W) of about 0.1 to about 10, wherein H1 is a maximum height (unit: μm) of the corresponding one of the embossed optical patterns.

3. The optical film according to claim 1, wherein the metal complex salt dye and/or the organic black dye is comprised in an amount of about 0.01 wt % to about 10 wt % in the second resin layer.

4. The optical film according to claim 1, wherein the metal complex salt dye and/or the organic black dye has an average particle diameter (D50) of about 1 nm to about 30 nm.

5. The optical film according to claim 4, wherein a ratio of the average particle diameter (D50) of the metal complex salt dye and/or the organic black dye to the maximum width W of the embossed optical pattern, and a ratio of the average particle diameter (D50) of the metal complex salt dye and/or the organic black dye to a width of the flat section are each about 1:300 to about 1:800.

6. The optical film according to claim 1, wherein the metal complex salt dye comprises a black dye containing chromium (Cr), nickel (Ni), cobalt (Co), or copper (Cu).

7. The optical film according to claim 6, wherein the metal complex salt dye comprises a black dye containing chromium.

8. The optical film according to claim 1, wherein the metal complex salt dye comprises an azo-based dye.

9. The optical film according to claim 1, wherein the metal complex salt dye comprises an azo-based dye having a $C_6$ to $C_{20}$ monocyclic or polycyclic aromatic functional group.

10. The optical film according to claim 1, wherein the metal complex salt dye comprises an azo-based dye containing chromium and a $C_6$ to $C_{20}$ monocyclic or polycyclic aromatic functional group, has an average particle diameter (D50) of about 1 nm to about 30 nm, and is comprised in an amount of about 0.01 wt % to about 10 wt % in the second resin layer.

11. The optical film according to claim 1, wherein the organic black dye comprises a first dye having a maximum absorption wavelength of about 430 nm to about 450 nm, a second dye having a maximum absorption wavelength of about 510 nm to about 530 nm, and a third dye having a maximum absorption wavelength of about 590 nm to about 610 nm.

12. The optical film according to claim 11, wherein each of the first dye, the second dye, and the third dye comprises an azo-based dye.

13. The optical film according to claim 12, wherein the first dye is represented by Formula 1; the second dye is represented by Formula 2; and the third dye is represented by Formula 3:

Formula 1

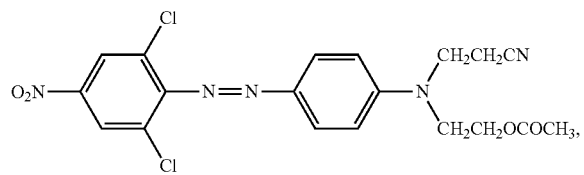

Formula 2

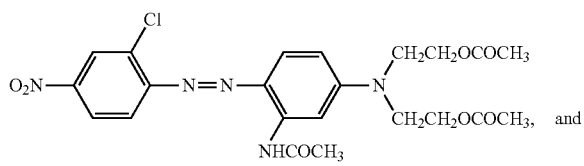
and

Formula 3

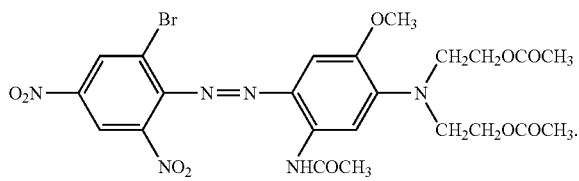

14. The optical film according to claim 1, wherein the first resin layer is adhesive.

15. The optical film according to claim 1, wherein the embossed optical pattern has a trapezoidal, rectangular, and/or square-shaped cross-sectional shape.

16. A polarizing plate comprising:
a polarizing film; and
the optical film according to claim 1, the optical film being on a light exit surface of the polarizing film.

17. A liquid crystal display comprising the polarizing plate according to claim 16.

* * * * *